(12) United States Patent
Matsushita et al.

(10) Patent No.: US 11,794,684 B2
(45) Date of Patent: Oct. 24, 2023

(54) PASSENGER RESTRAINT DEVICE

(71) Applicant: Autoliv Development AB, Vargarda (SE)

(72) Inventors: Tetsuya Matsushita, Kanagawa (JP); Hiroyuki Saito, Kanagawa (JP)

(*) Notice: Subject to any disclaimer, the term of this patent is extended or adjusted under 35 U.S.C. 154(b) by 0 days.

(21) Appl. No.: 17/261,083

(22) PCT Filed: Jun. 28, 2019

(86) PCT No.: PCT/JP2019/025942
§ 371 (c)(1),
(2) Date: Jan. 18, 2021

(87) PCT Pub. No.: WO2020/017281
PCT Pub. Date: Jan. 23, 2020

(65) Prior Publication Data
US 2021/0316695 A1    Oct. 14, 2021

(30) Foreign Application Priority Data
Jul. 19, 2018 (JP) .................................. 2018-135888

(51) Int. Cl.
*B60R 21/231* (2011.01)
*B60R 21/207* (2006.01)
*B60R 21/2338* (2011.01)

(52) U.S. Cl.
CPC ...... *B60R 21/23138* (2013.01); *B60R 21/207* (2013.01); *B60R 21/2338* (2013.01);
(Continued)

(58) Field of Classification Search
CPC ............ B60R 21/23138; B60R 21/207; B60R 21/2338; B60R 2021/23146; B60R 2021/23386
See application file for complete search history.

(56) References Cited

U.S. PATENT DOCUMENTS 6,029,993 A * 2/2000 Mueller ............ B60R 21/23138
280/730.2
8,899,619 B2 * 12/2014 Fukawatase .......... B60R 21/207
280/749
(Continued)

FOREIGN PATENT DOCUMENTS

JP   2013-220714 A   10/2013
JP   2013220714 A *  10/2013
(Continued)

OTHER PUBLICATIONS

Notification of Grounds for Rejection received in corresponding Korean application No. 10-2021-7002795, dated Oct. 7, 2022.

*Primary Examiner* — Jason D Shanske
*Assistant Examiner* — Joselynn Y Sliteris
(74) *Attorney, Agent, or Firm* — Harness, Dickey & Pierce, P.L.C.; Stephen T. Olson

(57) ABSTRACT

Pair of airbags, a left side tensile cloth and the right side tensile cloth stowed within the seat cushion of the seat, and a lower tensile cloth that connects both ends of the left side tensile cloth and the right side tensile cloth in the inner portion of the seat cushion, wherein the lower tensile cloth is disposed in the center in the left-right direction of the seat cushion and to the front side of center in the front-rear direction of the seat cushion, where the left side tensile cloth and the right side tensile cloth extend to the left and right rearwardly from both the left and right ends of the lower tensile cloth in the inner portion of the cushion, such that the left side tensile cloth and the right side tensile cloth are stretched between the seatback and the seat cushion when the airbag expands and deploys.

12 Claims, 3 Drawing Sheets

(52) U.S. Cl.
CPC ............... *B60R 2021/23146* (2013.01); *B60R 2021/23386* (2013.01)

(56) References Cited

U.S. PATENT DOCUMENTS

| | | | |
|---|---|---|---|
| 9,193,326 B2 * | 11/2015 | Fukawatase | B60R 21/207 |
| 9,238,425 B2 * | 1/2016 | Fukawatase | B60R 21/013 |
| 10,189,432 B2 * | 1/2019 | Matsushita | B60R 21/207 |
| 10,864,878 B2 * | 12/2020 | Nagasawa | B60R 21/23138 |
| 11,021,129 B2 * | 6/2021 | Saito | B60R 21/23138 |
| 2017/0259774 A1 * | 9/2017 | Matsushita | B60R 22/12 |
| 2020/0238944 A1 * | 7/2020 | Huf | B60R 21/2165 |
| 2021/0370863 A1 * | 12/2021 | Gwon | B60R 21/23138 |

FOREIGN PATENT DOCUMENTS

| | | | |
|---|---|---|---|
| JP | 2014-12475 A | | 1/2014 |
| JP | 201412475 A | * | 1/2014 |
| KR | 10-2017-0036014 A | | 3/2017 |
| WO | 2016/039160 A1 | | 3/2016 |
| WO | WO2016039160 A | * | 3/2016 |

\* cited by examiner

[FIG. 1]
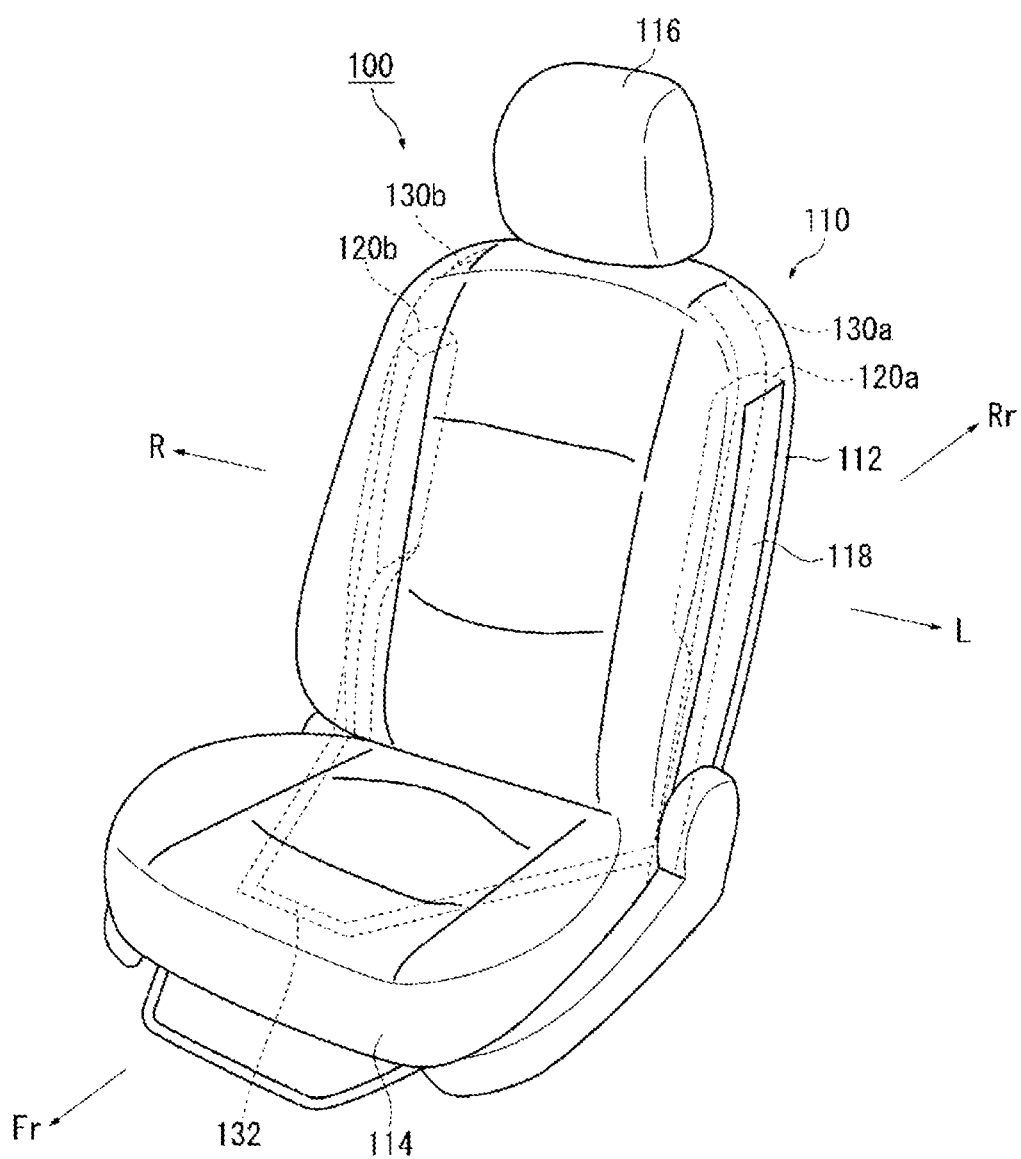

PASSENGER RESTRAINT DEVICE

TECHNICAL FIELD

The present invention relates to a passenger restraining device that restrains a passenger sitting on a seat of a vehicle.

BACKGROUND

Airbag devices have generally become standard equipment in vehicles in recent years. An airbag device is a safety device which is operated in case of an emergency such as a vehicle collision and, for example, expands and deploys to protect the passenger. There are various types of airbag devices depending on the installation site and application. For example, a side airbag that expands and deploys to the immediate sides of a passenger on both sides of a seat is provided in a passenger restraining device in Patent Document 1.

In particular, in the passenger restraining device of Patent Document 1, a tensile cloth is provided that is tensioned during expansion and deployment of the airbag and extends between both sides of the airbag and the seat cushion. Thereby, an effect of suppressing movement of the airbag in the left-right direction by the tensile cloth can be increased. Therefore, passenger restraining performance by the airbag can be further increased.

RELATED ART DOCUMENTS

Patent Documents

[Patent Document 1] WO 2017-039160

SUMMARY OF THE INVENTION

Problem to be Solved by the Invention

According to the passenger restraining device of Patent Document 1, movement of the airbag in a direction away from the passenger can be suitably controlled by the tensile cloth, and passenger restraining performance by the airbag has increased dramatically. However, there is always a need to improve passenger restraining performance for passenger restraining devices.

In light of the problems described above, an object of the present invention is to provide a passenger restraining device that further improves passenger restraining performance.

Means for Solving the Problem

In order to solve the problems as described above, a representative configuration of a passenger restraining device according to the present invention is a passenger restraining device that restrains a passenger seated in a seat of a vehicle, including a pair of airbags stowed in the inner portion on both the left and right sides of the seat that respectively expand and deploy to the left and right of the passenger, a left side tensile cloth and a right side tensile cloth that are stowed from within the seatback of the seat to within the seat cushion of the seat which deploys on exterior surfaces of each of the airbags during expansion and deployment of the pair of airbags, and a lower tensile cloth that extends in the left-right direction inside the seat cushion and connects the front ends of the left side tensile cloth and the right side tensile cloth, wherein the lower tensile cloth is disposed at least in the vicinity of the center in the left-right direction of the seat cushion, and further, disposed more to the front side of the center of the seat cushion in the front-rear direction, and where the left side tensile cloth and the right side tensile cloth are disposed extending in both the left and right directions rearwardly from both the left and right ends of the lower tensile cloth inside the seat cushion, such that when the airbag expands and deploys, the left side tensile cloth and the right side tensile cloth deploy on the side part of the seat and stretch between the seatback and the seat cushion.

According to the configuration described above, the left side tensile cloth, the right side tensile cloth, and the lower tensile cloth (collectively referred to as "tensile cloth" in the case where these are not particularly distinguished) are arranged in a trapezoidal shape with the lower side removed when the seat cushion is viewed from above. As a result, when the tensile cloth is disposed along the outer periphery of the seat cushion having a substantially square shape (when the tensile cloth is long), the length of the tensile cloth is shortened. Therefore, an effect of biasing the airbag toward the passenger by the tensile cloth can be enhanced. As a result, the passenger restraining performance of the passenger restraining device can be further improved.

The pair of airbags described above are preferably provided inside the left and right sides of the seatback of the seat. This configuration also enables obtaining the same effect as described above.

The locations where the surface skin of the seat cushion is cleaved by the left side tensile cloth and the right side tensile cloth is preferably disposed to the rear side of the center in the front and back direction of the seat cushion. With this type of configuration, the length of the tensile cloth can be adjusted shorter compared to a case where the point where the surface skin of the seat cushion is cleaved by the left side tensile cloth and the right side tensile cloth (hereinafter referred to as the cleavage point) is disposed to the front side of the center in the front-rear direction of the seat cushion. Therefore, the effects as described above can be enhanced.

The left side tensile cloth and the right side tensile cloth described above preferably laterally pass the thigh of the passenger between the seatback and the seat cushion when deployed on the side part of the seat. As a result, the thigh of the passenger can be restrained by the left side tensile cloth and the right side tensile cloth deployed on the side part of the seat. Therefore, further improvement of passenger restraining performance is feasible.

The length of the lower tensile cloth described above in the left-right direction is preferably narrower than the width of the waist of the occupant when viewed from the front of the passenger while seated, when both left and right legs of the passenger are positioned at the center of the seat cushion in the left-right direction. As a result, the front ends of the left side tensile cloth and the right side tensile cloth connected to the lower tensile cloth are disposed in a position in the vicinity of the waist of the passenger. Therefore, the left side tensile cloth and the right side tensile cloth can more reliably and quickly restrain the waist of the passenger, and the effects as described can be enhanced.

Effects of the Invention

According to the invention, a passenger restraining device can be provided in which passenger restraining performance is further improved.

BRIEF DESCRIPTION OF THE DRAWINGS

FIG. 1 is a diagram illustrating a passenger restraining device according to embodiment 1.

DESCRIPTION OF THE PREFERRED EMBODIMENT

Figure 2A:
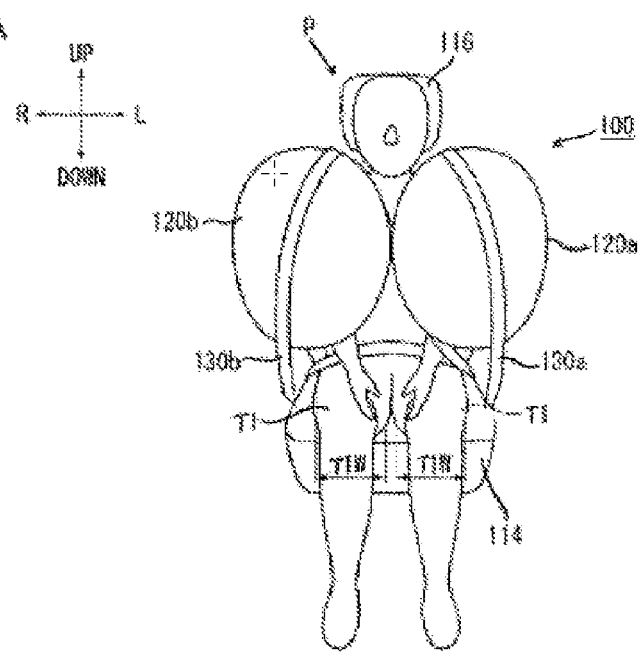
FIGS. 2 (a) and (b) are a diagrams illustrating a passenger in a seated state on a seat of FIG. 1.

Preferred embodiments according to the present invention will hereinafter be described in detail with reference to the appended drawings. The dimensions, materials, other specific numerical values, etc. indicated in such embodiments are mere exemplifications for ease of understanding of the invention and do not limit the present invention unless otherwise noted. Note that in the present specification and drawings, elements having substantially identical functions and configurations are labeled with identical symbols in order to omit redundant descriptions along with the illustration of elements not directly related to the present invention.

Note that regarding this embodiment, when a passenger is seated in a seat in a regular posture, the direction the passenger faces is referred to as the front, and the opposite direction is referred to as the rear. Moreover, when the passenger is seated in the seat in a regular posture, the right of the passenger is referred to as the right direction, and the left of the passenger is referred to as the left direction. Furthermore, when the passenger is seated in a regular posture, the direction towards the head of the passenger is referred to as up, and the direction towards the legs of the passenger is referred to as down. In addition, as needed, any diagrams used in descriptions below will indicate the front, rear, left, right, up, and down directions based on the passenger as described above as Fr, Rr, L, R, Up, and Down.

FIG. 1 is a diagram illustrating a passenger restraining device 100 according to the present embodiment. For ease of understanding, FIG. 1 illustrates the members stowed inside a seat 110 (an airbag and tensile cloth, described below) using dashed lines. Furthermore, in FIG. 1, the seat is illustrated with the airbag not expanded and deployed.

The passenger restraining device 100 of the present embodiment is a device for restraining a passenger that is seated in the seat 110. As illustrated in FIG. 1, the passenger restraining device 100 of embodiment 1 includes the seat 110, airbags 120a and 120b, a left side tensile cloth 130a, and a right side tensile cloth 130b of the vehicle (full vehicle not illustrated).

The seat 110 includes a seatback 112 that supports the upper body of the passenger. A seat cushion 114 is provided below the seatback 112 on which the passenger sits. A headrest 116 is provided above the seatback that supports the head of the passenger. Note that the seat cushion 114 in the present embodiment includes a cushion portion at a lower portion of the seat surface and a seat pan disposed below the cushion portion.

As illustrated in FIG. 1, the airbags 120a and 120b (side airbags) are stowed in both the left and right sides of the seatback 112 of the seat 110, which are covered by covers 118. As described below, the airbags 120a and 120b on the left and right sides, as a pair, expand and deploy on the left and right sides of the passenger seated in the seat 110 during a collision or the like of the vehicle.

Note that while the present embodiment illustrates an example in which the airbags 120a and 120b are stowed in the seatback 112 of the seat 110, this is not a limitation. The present invention can be applied even when the airbags 120a and 120b are stowed in the seat cushion 114 of the seat 110.

The left side tensile cloth 130a and the right side tensile cloth 130b are respectively provided for the pair of airbags 120a and 120b. The left side tensile cloth 130a and the right side tensile cloth 130b are respectively stowed from the seatback 112 to the seat cushion 114 of the seat 110 on the side of the pair of stowed airbags 120a and 120b opposite the passenger.

Figure 2B:
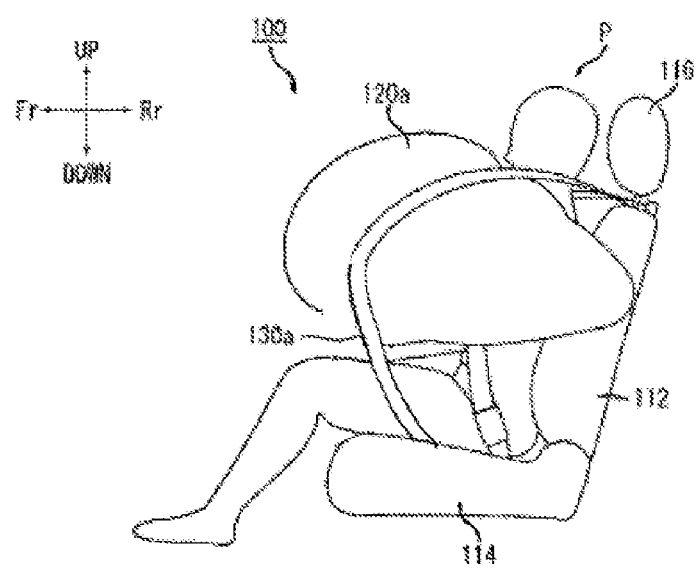

FIG. 2 is a diagram illustrating a passenger P in a seated state on the seat 110 of FIG. 1. FIG. 2 (a) illustrates the seat 110 of FIG. 1 from a forward view of the vehicle. FIG. 2 (b) illustrates the seat 110 of FIG. 1 from a rear view of the vehicle.

FIG. 2 (a) and FIG. 2 (b) illustrate the state in which the airbags 120a and 120b are expanded and deployed, where a passenger P is assumed by a Hybrid-III50th Percentile Male Dummy/Hybrid-III5th Percentile Female Dummy (human body dummy for frontal collisions—adult male/adult female). The Hybrid-III50th Percentile Male Dummy/Hybrid-III5th Percentile Female Dummy is a human dummy for frontal collision tests set forth by NHTSA (National Highway Traffic Safety Administration) standard [49CFR Part572 Subparts E and O], and is compliant with all similar domestic TRIAS regulations (Traffic Safety and Nuisance Research Institute's Automobile type Approval test Standard: Test method for new types of automobiles).

As illustrated in FIG. 2 (a) and FIG. 2 (b), the airbags 120a and 120b expand and deploy respectively on the left and right of the passenger during a vehicle collision or the like. The left side tensile cloth 130a and the right side tensile cloth 130b cleave through the surface skin of the seat 110 by expansion and deployment of the airbags 120a and 120b, and thereby the airbags 120a and 120b respectively deploy to the opposite side surfaces, namely to the side parts of the seat 110 in contact with the outer surface of the pair of airbags 120a and 120b respectively. As illustrated in FIG. 2 (b), the left side tensile cloth 130a that had been deployed is stretched from the inner vicinity of the shoulder of the passenger P in the left-right direction of the upper surface of the seatback 112 to the seat cushion 114.

Note that FIG. 2 (a) and FIG. 2 (b) illustrate a configuration in which the left side tensile cloth 130a and the right side tensile cloth 130b are deployed from the upper surface of the seat cushion 114 to the exterior of the seat 110, however, the present invention is not limited thereto. For example, the same effect can be obtained as a configuration in which the left side tension fabric 130a and the right side tension fabric 130b are deployed from the side surface of the seat cushion 114 or from near the boundary between the side surface and the top surface to the outside of the seat 110.

Figure 3A:
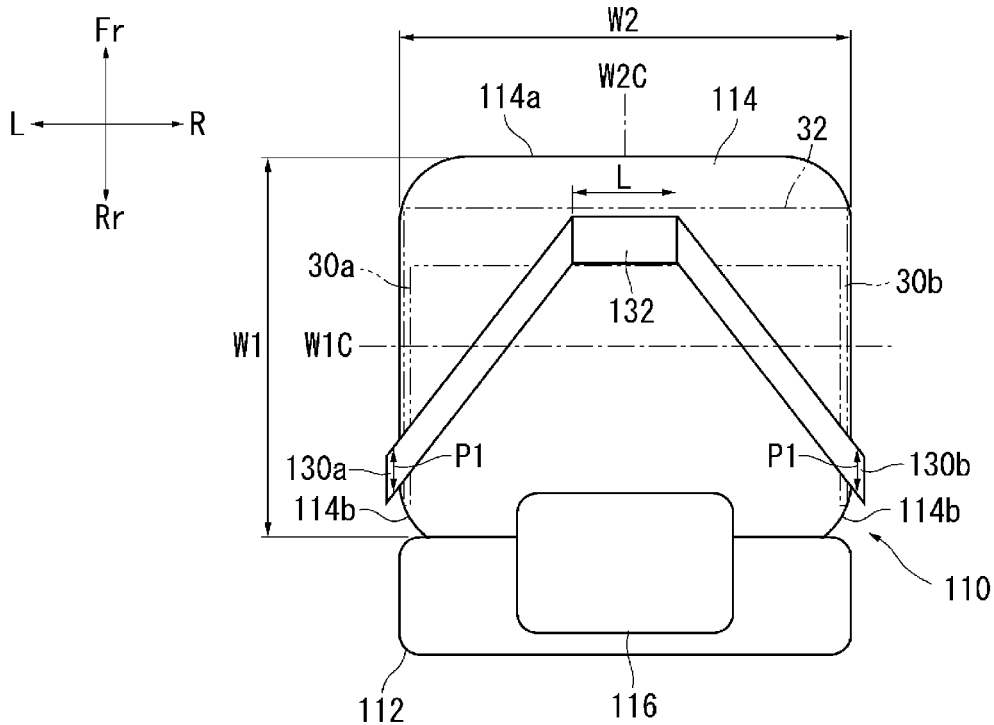
FIGS. 3 (a) and (b) illustrate an arrangement of a tensile cloth within the seat cushion of FIG. 1.
Figure 3B:
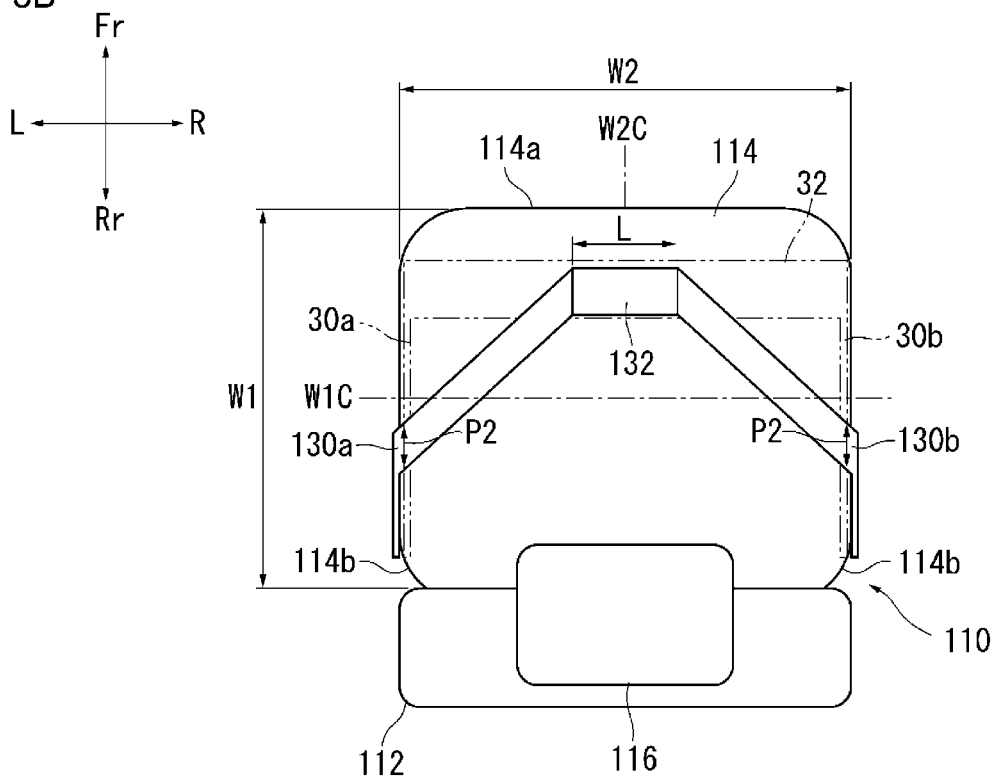

FIG. 3 is a diagram illustrating the arrangement of the tensile cloth inside the seat cushion 114 of FIG. 1. Note that, in FIG. 3 (a) and FIG. 3 (b), the arrangement of a conventional tensile cloth is illustrated by a double-dotted chain line.

As illustrated in FIG. 3 (a) and FIG. 3 (b), a lower tensile cloth 132 extends in the left and right direction inside the seat cushion 114, and connects the front ends of the left side tensile cloth 130a and the right side tensile cloth 130b. The lower tensile cloth 132 extending in the left and right direction is secured to the seat cushion 114 throughout.

Note that in the present embodiment, the configuration in which the lower tensile cloth 132 is secured to the seat cushion 114 throughout is illustrated, however, the present invention is not limited thereto. The connection point of the lower tensile cloth 132 with the left side tensile cloth 130a and the right side tensile cloth 130b should be secured to the seat cushion 114.

As illustrated in FIG. 3 (a), the lower tensile cloth 132 is positioned in a center W2C in the left and right direction (width W2) of the seat cushion 114, and is positioned more towards the front side than a center W1C in the front and back direction (width W1) of the seat cushion 114. As a result, the left side tensile cloth 130a and the right side tensile cloth 130b connected to the lower tensile cloth 132 are disposed inside the seat cushion 114 such that they extend rearwardly from left and right ends of the lower tensile cloth 132.

Here, as illustrated by the double-dotted chain line in FIG. 3 (a), conventionally, a lower tensile cloth 32 has approximately the same lateral width as a width W2 in the left and right direction of the seat cushion 114, and was disposed across the entire width thereof. A left side tensile cloth 30a and a right side tensile cloth 30b connected to both the left and right ends of the lower tensile cloth 32 are disposed along side edges 114b of the seat cushion 114.

In other words, when the conventional arrangement illustrated by the double-dotted chain line is employed in FIG. 3 (a) and FIG. 3 (b), the lower tensile cloth 32 is disposed along the front edge 114a of the seat cushion 114, and the left side tensile cloth 30a and the right side tensile cloth 30b are disposed along both side edges 114b of the seat cushion 114. Thus, within the seat cushion 114, the left side tensile cloth 30a, the right side tensile cloth 30b, and the lower tensile cloth 32 are disposed so as to substantially encircle around the outer periphery of the seat cushion 114.

In contrast, in the passenger restraining device 100 of the present embodiment, as illustrated with the solid line in FIG. 3 (a), the lower tensile cloth 132 is shorter than the left-right direction width W2 of the seat cushion 114. The left side tensile cloth 130a and the right side tensile cloth 130b are disposed so as to extend inclined in a direction away from the center in the left and right direction of the seat cushion 114 from both ends toward the rear.

According to the configuration described above, the left side tensile cloth 130a, the right side tensile cloth 130b, and the lower tensile cloth 132 are disposed in a trapezoidal shape with the lower side removed when the seat cushion 114 is viewed from above. Therefore, with the arrangement of the present embodiment, the overall length of the tensile cloth 130a, the right side tensile cloth 130b, and the lower tensile cloth 132 is shorter than an arrangement in which the tensile cloth is disposed along the outer periphery of the substantially quadrangular seat cushion 114, or in other words a conventional arrangement. As a result, tension in the tensile cloth 130a, the right side tensile cloth 130b, and the lower tensile cloth 132 can be increased, and the force that biases the airbags 120a and 120b toward the passenger is increased. As a result, the passenger restraining performance of the passenger restraining device 100 can be further improved.

Note that in the present embodiment, the left side tensile cloth 130a and the right side tensile cloth 130b are illustrated in a configuration extending in the left and right end directions rearwardly from both left and right ends of the lower tensile cloth 132 within the seat cushion 114, but are not limited thereto. For example, similar effects can be obtained even in a configuration in which the left side tensile cloth 130a and the right side tensile cloth 130b are disposed so as to spread out from the center in the left and right direction in the seat cushion 114.

In the present embodiment, as illustrated in FIG. 3 (a), the cleavage point P1 in the seat cushion 114 of the left side tensile cloth 130a and the right side tensile cloth 130b are disposed rearward of the center W1C in the front and rear direction of the seat cushion 114. As a result, the overall length of the tensile cloth 130a, right side tensile cloth 130b, and the lower tensile cloth 132 is shorter than when the cleavage point of the left side tensile cloth 130a and the right side tensile cloth 130b of the seat cushion 114 is disposed on the front side of the center W1C in the front-rear direction of the seat cushion 114. Therefore, the effects as described above can be enhanced.

Here, in FIG. 3 (a), the cleavage points P1 of the left side tensile cloth 130a and the right side tensile cloth 130b are disposed in the region behind the center W1C in the front-rear direction of the seat cushion 114, particularly in the vicinity of the rear end of the seat cushion 114. On the other hand, in FIG. 3 (b), the cleavage points P2 in the seat cushion 114 of the left side tensile cloth 130a and the right side tensile cloth 130b are disposed in the vicinity of the center W1C in the front-rear direction of the seat cushion 114. Even in the arrangement illustrated in FIG. 3 (b), the overall length of the tensile cloth 130a, the right side tensile cloth 130b, and the lower tensile cloth 132 is shorter than when a tensile fabric is disposed along the outer periphery of the seat cushion 114 in a conventional manner. Therefore, the same effects as those described above can be obtained.

However, as is apparent from FIG. 3 (b), if the cleavage points P2, which are located closer to the center W1C than the cleavage points P1 in FIG. 3 (a), are adopted, in the region behind the cleavage points P2, the left side tensile fabric 130a and the right side tensile fabric 130b become disposed along a longer length of the side edge 114b of the seat cushion 114. Thus, in the arrangement illustrated in FIG. 3 (b), the overall length of the tensile cloth 130a, the right side tensile cloth 130b, and the lower tensile cloth 132 is shorter than the conventional arrangement illustrated by the double-dotted chain line, but is longer than the arrangement illustrated in FIG. 3 (a). Therefore, the cleavage points P1 are preferably disposed near the back end of the seat cushion 114 as illustrated in FIG. 3 (a).

Furthermore, in the present embodiment, as illustrated in FIG. 2 (b), the left side tensile cloth 130a laterally passes the thigh T1 of the passenger P between the seatback 112 and the seat cushion 114 when deployed on the side part of the seat 110. Although not shown in FIG. 2 (b), the right side tensile cloth 130b also laterally passes the thigh T1 of the passenger P. Thus, the left side tensile cloth 130a deployed on the side part of the seat 110 and the right side tensile cloth 130b constrain the thigh T1 of the passenger P. Therefore, further improvement of passenger restraining ability is possible.

Even more preferably, the length L of the lower tensile cloth 132 in the left-right direction is narrower than the width of both left and right legs of the passenger P when both the left and right legs are positioned in the center W2C of the seat cushion 114 in the left-right direction. Specifically, as illustrated in FIG. 2 (a), when the width of the legs T1 of the passenger P is taken as T1W, the length L of the lower tensile cloth 132 in the left and right direction is preferably narrower than "T1W×2".

Alternatively, the length L of the lower tensile cloth 132 in the left-right direction is preferably narrower than the waist part of the passenger P when viewed from the front of the passenger P when seated (see FIG. 2 (a)), when both left and right legs of the passenger P are disposed in the center W2C of the seat cushion 114 in the left-right direction. This enables left side tensile cloth 130a and the right side tensile cloth 130b to more reliably and quickly restrain the waist of the passenger, and improved passenger restraining performance can be obtained.

With the configuration described above, the left side tensile cloth 130a and the right side tensile cloth 130b connected to the lower tensile cloth 132 are disposed at positions in the vicinity of the left and right legs of the passenger P. Therefore, the left side tensile cloth 130a and the right side tensile cloth 130b can more reliably and quickly restrain the thigh T1 of the passenger P. This enables further improving the passenger restraining performance of the passenger restraining device 100.

Note that in the present embodiment, a configuration is illustrated where a tensile cloth is provided for each of the pair of airbags 120a and 120b on the left and right (the left side tensile cloth 130a and right side tensile cloth 130b), however, there is no limitation thereto. Therefore, the present invention can be applied to a configuration in which two or more tensile cloths are provided for one airbag.

In addition, in the present embodiment, a configuration is illustrated in which the left side tensile cloth 130a and the right side tensile cloth 130b are respectively deployed on the side of the seat 110 by cleaving the surface skin of the seat 110 by expansion and deployment of the airbags 120a and 120b, however, there is no limitation thereto. For example, if the left side tensile cloth 130a and the right side tensile cloth 130b are stowed in a case and mounted to the seat, the seat cushion can be configured to be cleaved after the left side tensile cloth 130a and the right side tensile cloth 130b exit the case.

Preferred examples of the present invention were described above while referring to the accompanying drawings. However, the embodiments described above are preferred examples of the present invention, and other embodiments can be implemented or performed by various methods. In particular, unless described otherwise in the specification of the present application, the invention is not restricted to the shape, size, configurational disposition, and the like of parts illustrated in detail in the accompanying drawings. Furthermore, expressions and terms used in the specification of the present application are used for providing a description, and the invention is not limited thereto, unless specifically described otherwise.

Therefore, it is obvious that a person with ordinary skill in the art can conceive of various changed examples or modified examples within the scope described in the scope of the claims, which is understood to naturally belong to the technical scope of the present invention.

INDUSTRIAL APPLICABILITY

The present invention can be used in a passenger restraining device that restrains a passenger sitting on a seat of a vehicle.

REFERENCE NUMERALS

P1: femur; 30a: left side tensile cloth; 30b: right side tensile cloth; 32: lower tensile cloth; 100: passenger restraining device; 110: seat; 112: seatback; 114: seat cushion; 114a: front edge; 114b: side edges; 116: headrest; 120a: airbag; 120b: airbag; 130a: left side tensile cloth; 130b: right side tensile cloth; 132: lower tensile cloth; P: passenger

The invention claimed is:

1. A passenger restraining device for restraining a passenger seated in a seat of a vehicle, the passenger restraining device comprising:
a pair of airbags stowable in an inner portion on both left and right sides of the seat, respectively, for expansion and deployment to left and right sides of the passenger, respectively,
a left side tensile cloth and a right side tensile cloth stowable from within a seatback of the seat to within a seat cushion of the seat which are deployable on exterior surfaces of each airbag of the pair of the airbags during expansion and deployment of the pair of airbags, and
a lower tensile cloth that extends in a left-right direction in an inner portion of the seat cushion and connects front ends of the left side tensile cloth and the right side tensile cloth, wherein:
the lower tensile cloth is disposed at least in a vicinity of a center in the left-right direction of the seat cushion, and further disposed more on a front side of a center of the seat cushion in a front-rear direction,
the left side tensile cloth and the right side tensile cloth within the inner portion of the seat cushion are disposed to extend in both left and right directions rearwardly from both left and right ends of the lower tensile cloth within the inner portion of the seat cushion,
the left side tensile cloth and the right side tensile cloth are deployable outside the seat cushion on a side part of the seat stretched between the seatback and the seat cushion, and
the left side tensile cloth stowed within the inner portion of the seat cushion, the right side tensile cloth stowed within the inner portion of the seat cushion and the lower tensile cloth stowed within the inner portion of the seat cushion define three sides of a trapezoid when viewed from above,
wherein a length of the lower tensile cloth in the left-right direction is configured to be more narrow than a width of both left and right legs of the passenger when both the left and right legs are positioned in a center of the seat in the left-right direction.

2. The passenger restraining device according to claim 1, wherein the pair of airbags are provided in an inner portion of the seatback of the seat on both the left and right sides.

3. The passenger restraining device according to claim 2, wherein the left side tensile cloth and the right side tensile cloth are configured to pass laterally along a femur of the passenger between the seatback and the seat cushion when deployed on the side part of the seat.

4. The passenger restraining device according to claim 2, wherein the length of the lower tensile cloth in the left-right direction is configured to be narrower than a width of a waist portion of the passenger when viewed from a front of the passenger when seated, when both left and right legs of the passenger are positioned at the center of the seat cushion in the left-right direction.

5. The passenger restraining device according to claim 1, wherein a point of cleavage of the seat cushion by the left side tensile cloth and the right side tensile cloth is disposed rear of the center of the seat cushion in the front-rear direction.

6. The passenger restraining device according to claim 5, wherein the left side tensile cloth and the right side tensile cloth are configured to pass laterally along a femur of the passenger between the seatback and the seat cushion when deployed on the side part of the seat.

7. The passenger restraining device according to claim 1, wherein the length of the lower tensile cloth in the left-right direction is configured to be narrower than a width of a waist part of the passenger when viewed from a front of the passenger when seated, when both left and right legs of the passenger are positioned at the center of the seat cushion in the left-right direction.

8. The passenger restraining device according to claim 1, wherein the length of the lower tensile cloth is shorter than a width of the seat cushion.

9. The passenger restraining device according to claim 1, wherein the pair of airbags includes left and right airbags, and the left and right side tensile cloths both extend from upper attachment points inwardly spaced from laterally outermost portions of the seat, and upon inflation and deployment of the left and right airbags the left and right side tensile cloths extend in arcuate paths across the left and right airbags, respectively, to bias the left and right airbags into positions for restraining the passenger seated in the seat.

10. A passenger restraining device for restraining a passenger seated in a seat of a vehicle, the passenger restraining device comprising:
    first and second airbags stowable within first and second lateral sides of a seatback of the seat, respectively, for expansion and deployment to first and second lateral sides of the passenger, respectively,
    a first tensile cloth stowable from within the first lateral side of the seatback to within a seat cushion of the seat and deployable on an exterior surface of the first airbag during expansion and deployment of the first airbag;
    a second tensile cloth stowable from within the second lateral side of the seatback to within the seat cushion and deployable on an exterior surface of the second airbag during expansion and deployment of the second airbag, and
    a lower tensile cloth disposed within the seat cushion and laterally extending between the first and second tensile cloths,
    wherein the first and second tensile cloths and the lower tensile cloth cooperate to define three sides of a trapezoid within the seat cushion when viewed from above and during stowage within the seat cushion,
    wherein a length of the lower tensile cloth in a left-right direction is configured to be more narrow than a width of both left and right legs of the passenger when both the left and right legs are positioned in a center of the seat in the left-right direction.

11. The passenger restraining device according to claim 10, wherein the first and second tensile cloths both extend from upper attachment points inwardly spaced from laterally outermost portions of the seat, and upon inflation and deployment of the first and second airbags the first and second tensile cloths extend in arcuate paths across the first and second airbags, respectively, to bias the first and second airbags into positions for restraining the passenger seated in the seat.

12. A passenger restraining device for restraining a passenger seated in a seat of a vehicle, the passenger restraining device comprising:
    a pair of airbags stowable in an inner portion on both left and right sides of the seat, respectively, for expansion and deployment to left and right sides of the passenger, respectively,
    a left side tensile cloth and a right side tensile cloth stowable from within a seatback of the seat to within a seat cushion of the seat which are deployable on exterior surfaces of each airbag of the pair of the airbags during expansion and deployment of the pair of airbags, and
    a lower tensile cloth that extends in a left-right direction in an inner portion of the seat cushion and connects front ends of the left side tensile cloth and the right side tensile cloth, wherein:
    the lower tensile cloth is disposed at least in a vicinity of a center in the left-right direction of the seat cushion, and further disposed more on a front side of a center of the seat cushion in a front-rear direction,
    the left side tensile cloth and the right side tensile cloth within the inner portion of the seat cushion are disposed to extend in both left and right directions rearwardly from both left and right ends of the lower tensile cloth within the inner portion of the seat cushion,
    the left side tensile cloth and the right side tensile cloth are deployable outside the seat cushion on a side part of the seat stretched between the seatback and the seat cushion, and
    the left side tensile cloth stowed within the inner portion of the seat cushion, the right side tensile cloth stowed within the inner portion of the seat cushion and the lower tensile cloth stowed within the inner portion of the seat cushion define three sides of a trapezoid when viewed from above,
    wherein the pair of airbags includes left and right airbags, and
    wherein the left and right side tensile cloths both extend from upper attachment points inwardly spaced from laterally outermost portions of the seat, and upon inflation and deployment of the left and right airbags the left and right side tensile cloths extend in arcuate paths across the left and right airbags, respectively, to bias the left and right airbags into positions for restraining the passenger seated in the seat.

* * * * *